United States Patent [19]

Halling et al.

[11] 4,071,269
[45] Jan. 31, 1978

[54] FLEXIBLE PIPING JOINT

[75] Inventors: Horace P. Halling, Laurel; Bernard J. Sadoff, Jr., Rockville, both of Md.

[73] Assignee: Pressure Science Incorporated, Beltsville, Md.

[21] Appl. No.: 691,159

[22] Filed: May 28, 1976

[51] Int. Cl.² ............................................. F16L 27/04
[52] U.S. Cl. .................................. 285/165; 285/263; 285/334.4; 285/DIG. 18
[58] Field of Search ....... 285/263, 261, 233, DIG. 18, 285/165, 164, 334.4

[56] References Cited

U.S. PATENT DOCUMENTS

| 872,121 | 11/1907 | Greenlaw | 285/263 |
|---|---|---|---|
| 939,908 | 11/1909 | Greenlaw | 285/263 |
| 2,067,768 | 1/1937 | Krefft | 285/263 |
| 2,117,152 | 5/1938 | Crosti | 285/263 |
| 2,774,618 | 12/1965 | Alderson | 285/261 X |
| 3,033,595 | 5/1962 | Bard | 285/263 X |
| 3,404,904 | 10/1968 | Roe | 285/165 |
| 3,451,698 | 6/1969 | Chakroff | 285/165 |
| 3,759,550 | 9/1973 | Peress | 285/263 X |
| 3,797,836 | 3/1974 | Halling | 285/367 X |
| 3,799,586 | 3/1974 | Caras et al. | 285/165 X |

FOREIGN PATENT DOCUMENTS 489,884   1/1930   Germany ............................ 285/261

Primary Examiner—Thomas F. Callaghan
Attorney, Agent, or Firm—Roylance, Abrams, Berdo & Kaul

[57] ABSTRACT

A flexible piping joint in the form of a fluid-tight coupling and sealing apparatus for two tubes having high pressure fluid flowing therethrough, the joint having angular, axial and rotational flexibility and comprising a metallic, resilient annular sealing element on the first tube in an interference fit with the interior surface of the second tube, and a guiding mechanism for maintaining the intersection point of the tubes' centerlines during angular misalignment in the plane containing the line of contact of the sealing element and the interior surface of the second tube.

13 Claims, 5 Drawing Figures

FLEXIBLE PIPING JOINT

The present invention relates to a fluid-tight coupling and sealing apparatus for two tubes having high pressure fluid flowing therethrough capable of angular, axial and rotational flexibility, and more particularly relates to a coupling and sealing apparatus including a metallic, resilient annular sealing element and a guiding mechanism for restraining the angular misalignment between the two coupled and sealed tubes.

As dislcosed in our concurrently filed patent applications entitled TUBE AND CYLINDRICAL SURFACE SEALING APPARATUS Ser. No. 691,160 and PRESSURE COMPENSATED SLIDE JOINT 691,157, a unique metallic, resilient sealing mechanism for two tubes can be advantageously used in piping systems having fluid under pressure flowing therethrough, which systems are exposed to extreme temperatures, radiation, thermal expansion and contraction, dimensional tolerances and vibrational deflections. Thus, the sealing mechanism disclosed in those applications can be used in aircraft and such other systems where a lightweight, compact sealing mechanism is required which can withstand extreme temperatures.

In addition to these problems which are solved by the sealing mechanism disclosed in these applications, flexible joints with seals for two tubes, or ducts, must be able to withstand high acceleration and bending loads and accommodate angular, rotational and axial sliding motion. In certain situations such as aircraft tension ducting systems, the flexible joint must restrain axial movement of the tubes it joins. Moreover, it is important to be able to place joint flexible hoint with its center of angulation at the extreme end of a tube, adjacent the tube's connection to the source or utilizer of the fluid, so that the tube's angular misalignment is minimized.

The prior art flexible joint devices include bellows-sealed gimbal, hook or ball joints, none of which combine the capability of angulation, axial sliding and rotation in a single joint. Further, such joints are heavy and bulky and cannot be arranged with their centers of angulation at the extreme ends of tubes because of their bulk.

It is therefore an object of the present invention to provide a fluid-tight coupling and sealing apparatus for two tubes capable of axial, angular and rotational flexibility in which an effective seal is provided to prevent leakage and a guiding mechanism is provided to protect the seal by limiting the angular misalignment of the tubes.

Another object is to provide a fluid-tight coupling and sealing apparatus which is light in weight and compact in volume so as to be readily used in aircraft systems.

Another object is to provide a fluid-tight coupling and sealing apparatus which can transmit the tension loads due to pressure across the flexible joint joining the two tubes.

Another object is to provide a fluid-tight coupling and sealing apparatus which can withstand high acceleration forces and vibrational loads at extreme temperatures and under the influences of radiation.

Another object is to provide a joint with angular flexibility which is so compact that it can fit essentially within the space of a typical releaseable connection so as to save both weight and space as well as to place the centers of angulation at the extreme ends of the piping, which provides maximum lateral offset misalignment.

Another object is to provide joints with limits or stops to their angulating capability so as to ensure that when a multiplicity of such joints are used in a single duct the total angulation of the duct will be shared by each joint.

A further object is to provide a joint with a single sealing element that is capable of both angular and axial motion, to minimize potential leakage and achieve simplicity of production.

The foregoing objects are basically attained by providing a fluid-tight coupling and sealing apparatus for a first tube and a second tube having high pressure fluid flowing therethrough, wherein the combination comprises a metallic, resilient annular sealing element extending from the first tube, the sealing element having a ring portion having an outer surface with a maximum free diameter greater than the diameter of the interior surface of the second tube and in contact via an interference fit with the interior surface of the second tube, and guiding means, coupled at least to the first tube, for maintaining the intersection point of the center lines of the tubes during angular misalignment thereof in the plane containing the line of contact of the annular sealing element and the interior surface of the second tube.

The sealing element in addition to the ring portion has a frustoconical portion, the larger end of which extends into to the ring portion, and a cylindrical portion, the smaller end of the frustoconical portion extending into the cylindrical portion. This entire sealing element is resilient and is made of thin metal which allows it to function effectively in extreme temperatures. The ring portion has a curved outer surface with a radius of curvature less than the radius of the interior surface of the second tube, thereby providing a high contact stress between it and the second tube, thereby reducing the chance of leakage even under relative axial, angular and rotational movement.

During angular misalignment of the center lines of the first and second tubes, the line of contact of the interference fit between the sealing element and the second tube is substantially elliptical and the center point of the ellipse coincides with the intersection point of the two tubes' center lines by means of the guiding mechanism. This assures that the sealing element and the second tube remain in intimate spring loaded contact and provides a restraint on the angular misalignment of the two tubes. Moreover, it allows the coupling of the two tubes to sustain tension loading.

The guiding mechanism accomplishes these results by being formed of a guiding assembly defining an arcuate annular cavity between first and second arcuate ring members wherein the surfaces of these ring members defining the cavity are spherical segments with the center of the sphere being located at the intersection point of the two tubes' center lines during angular misalignment thereof, and a follower assembly including a follower movable in the cavity, wherein the opposed surfaces of the follower are spherical segments with the center of the sphere also being located at the intersection point of the two tubes' center lines during the angular misalignment thereof.

A second embodiment of the present invention provides for limited axial movement of one tube relative to the other, while also providing the angular misalignment restraint to the coupling apparatus and rotational capability between the two tubes.

A third embodiment of the present invention provides for the angular misalignment restraint as well as a releasable connection between two parts making up one of the tubes, thereby allowing placement of the center of angulation of the joint at extreme end of a tube in the piping system.

As used herein, the phrase "interference fit" means that with the ring portion outer surface having a slightly larger maximum free diameter than the diameter of the interior surface of the second tube and with the ring portion being resilient, on forcing the ring portion into the interior surface of the second tube the ring portion will be elastically deformed and thus maintained in intimate circumferential contact with the interior surface due to the reactive force of the elastic deformation.

As used herein, the phrase "free diameter" means the outer diameter of the ring portion curved surface prior to installation with the interior surface, and therefore prior to its elastic deformation.

Other objects, advantages and salient features of the present invention will become apparent from the following detailed description, which, taken in conjunction with the annexed drawings, discloses preferred embodiments of the present invention.

DRAWINGS

Referring now to the drawings which form a part of this original disclosure:

FIG. 2 is a side elevational view in partial longitudinal section of the two tubes and fluid-tight coupling and sealing apparatus shown in FIG. 1, except the center lines of the two tubes are angularly misaligned by angle a;

Figure 5:
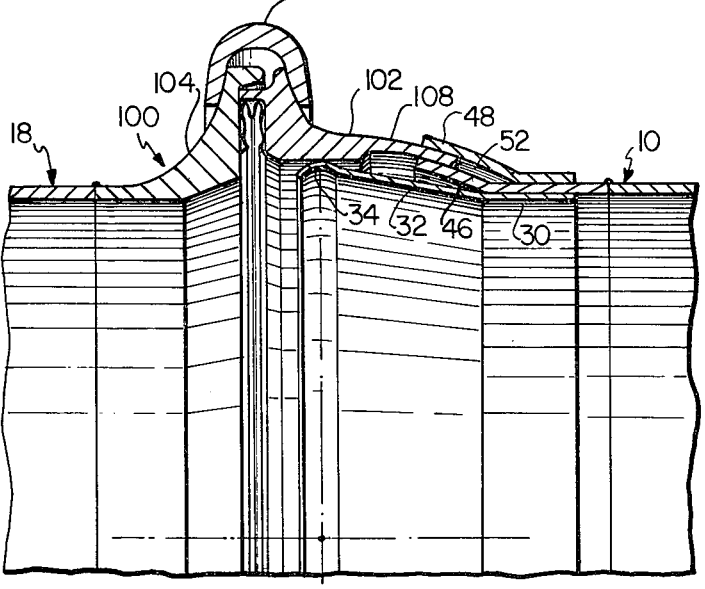
Figure 3:
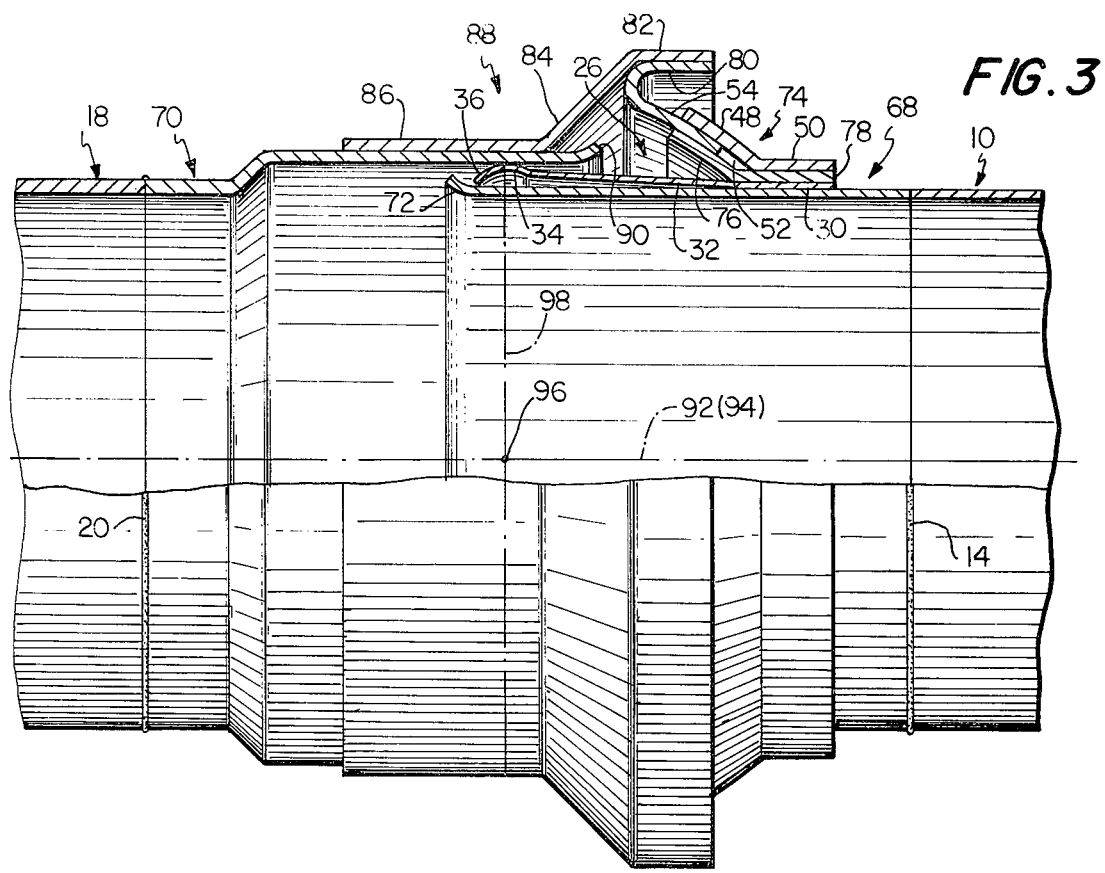
FIG. 3 is a side elevational view in partial longitudinal section of two tubes and a fluid-tight coupling and sealing apparatus thereon in accordance with the present invention with the center lines of the two tubes being aligned and with the guiding mechanism on the first tube allowing axial movement of the second tube relative to the first tube.
Figure 4:
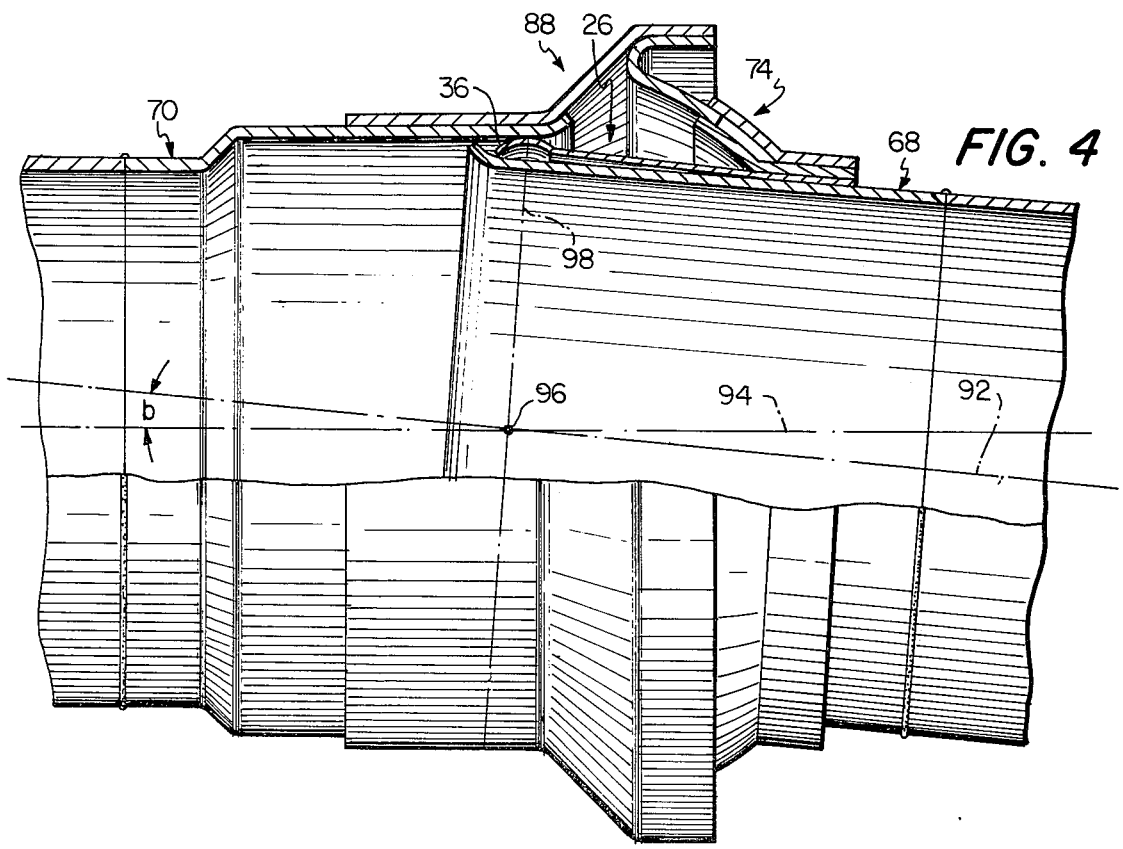

FIG. 4 is a side elevational view in partial longitudinal section of the two tubes and fluid-tight coupling and sealing apparatus shown in FIG. 3, except the center lines of the two tubes are angularly misaligned by an angle b and the tubes have experienced relative axial movement; and FIG. 5 is a side elevational, fragmentary view in longitudinal section of two tubes having the fluid-tight coupling and sealing apparatus thereon in accordance with the present invention, wherein one of the tubes has two sections which can be releasably connected.

DETAILED DESCRIPTION OF THE INVENTION

Figure 1:
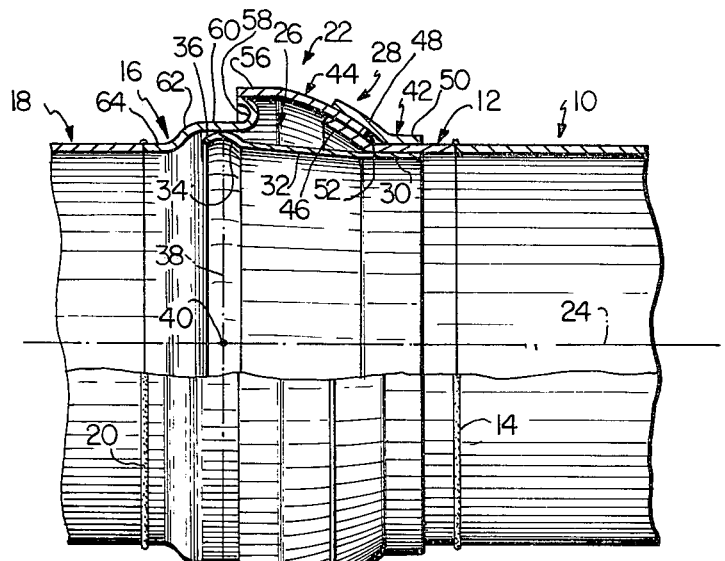
FIG. 1 is a side elevational view in partial longitudinal section of two tubes having a fluid-tight coupling and sealing apparatus thereon in accordance with the present invention, these two tubes having their center lines aligned.

Referring to the drawings in further detail, as shown in FIG. 1, a piping system having high pressure fluid flowing therethrough is illustrated by a first conduit 10, a first tube 12 welded along weld line 14 to the first conduit 10, a second tube 16 welded to a second conduit 18 along weld line 20, and the flexible joint in the form of a fluid-tight coupling and sealing apparatus 22 coupling the first tube 12 and the second tube 16.

As shown in FIG. 1, the center lines of tubes 12 and 16 coincide in center line 24 since the tubes are aligned.

Apparatus 22 comprises a sealing element 26 and a guiding mechanism 28.

The sealing element 26 comprises a cylindrical portion 30 welded to the interior surface of tube 12, a frustoconical portion 32 having its smaller end extending from the cylindrical portion, and a ring portion 34 extending from the larger end of the frustoconical portion. The sealing element is formed from a metallic material with good high temperature spring properties such as a high strength alloy, for example, Inconel 718 or Waspalloy. The longitudinal cross-sectional thickness of the wall forming the sealing element is quite thin, from about 0.003–0.020 inch for 1 to 15 inch tube diameters, so it is resilient and elastically deformable.

The ring portion 34 has a curved outer surface 36 which has a maximum free diameter greater than the diameter of the second tube 16 in the area in which this outer surface contacts the interior surface of the tube. Thus, as shown in FIG. 1, when the ring portion 34 is forced into the open end of the second tube 16 it is slightly compressed, or deformed, and forms an interference fit with the second tube, such fit being defined above. The interference fit must be relatively light to insure that the resilient sealing element is not stressed beyond its elastic limit and to permit relative sliding and rotation of the sealing member and the tube's interior surface while in sealing contact. Although this interference fit is relatively light, good sealing characteristics are present since pressure of the fluid in the tubes tends to force the sealing member outwardly into its sealing contact, thereby making the seal "pressure energized". In the tube diameter range of one to fifteen inches the interference fit will range from about 0.002 to 0.005 to about 0.015 to 0.025 inch. This interference fit is sufficient to keep the ring portion 34 in contact with the second tube 16, but also allows for relative movement of the ring portion 34 and the second tube 16.

As shown in FIG. 1, the radius of curvature of the curved outer surface 36 of the ring portion 34 is less than the radius of the second tube 16 in the contact area, which provides a high contact stress between these two parts, thereby providing a tight seal.

The plane containing the seal interference of the outer surface 36 and the interior surface of the second tube 16 is designated by numeral 38, such contact being a circular line with the two tubes being aligned as shown in FIG. 1. The center of this circle is designated by numeral 40.

The guiding mechanism 28 comprises a guide assembly 42 and a follower assembly 44.

The guide assembly 42 comprises a first arcuate ring member 46 formed as an annular flange on the end of the first tube 12 and a second arcuate ring member 48 rigidly coupled at its ring base 50 to the outside of the first tube 12. The first and second arcuate ring members are spaced apart to define an arcuate cavity 52 therebetween. The surfaces of the first and second arcuate ring members defining the arcuate cavity 52 are spherical segments with the center of the spheres being located at the intersection point of the centers lines of tubes 12 and 16 after the tubes having been angularly misaligned. In addition, the center of that sphere also coincides with the center of the circle designated 40 in FIG. 1.

The follower assembly 44 includes an arcuate follower 54 which is movable in the arcuate cavity 52 and which has a thickness substantially equal to the thickness of the cavity. The opposed surfaces of the arcuate follower are spherical segments with the center of the sphere being located at the intersection point of the centers lines of tubes 12 and 16 after they have ben angularly misaligned. In addition, the center of that spheres is also the center of the circle designated 40 in FIG. 1.

The follower assembly 44 also includes a cylindrical part 56 extending from the arcuate follower 54, which cylindrical part is rigidly coupled to a curved annular part 58 at the end of the second tube 16. This curved annular part 58 extends into a ring part 60 which extends into the larger end of a frustoconical part 62 which has its smaller end extending into an end ring part 64.

The curved outer surface 36 of ring portion 34 has its interference fit with the interior surfaces of the ring part 60 and the frustoconical part 62 forming the second tube 16.

Figure 2:
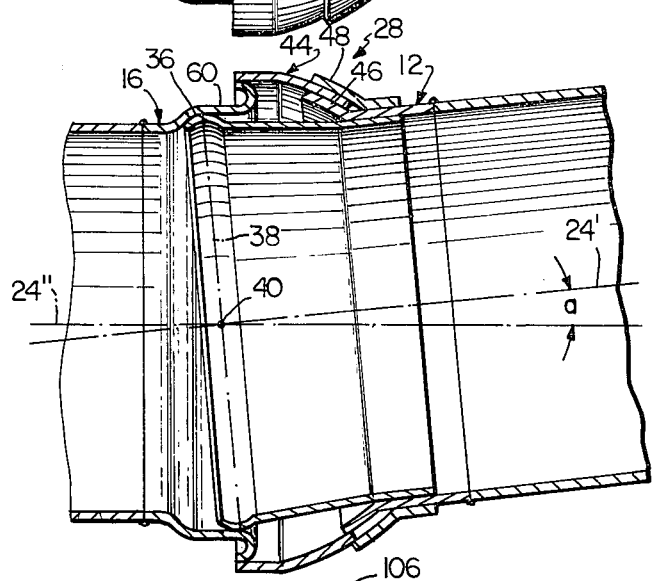

Referring now to FIG. 2, the first tube 12 is shown angularly misaligned with the second tube 16 by an angle a of about 5°. This angular misalignment can be caused by a various number of factors, including thermal expansion and contraction, dimensional tolerances and mechanical deflections being placed on the tubes.

As shown specifically in FIG. 2, the center line 24' of the first tube 12 and the center line 24" of the second tube 16 have an intersection point which coincides with point 40 shown in FIG. 1. Because of the spherical segmented surfaces on the follower 44, the first arcuate ring member 46 and the second arcuate ring member 48, the plane containing the line of contact of the curved outer surface 36 and the inner surface of ring part 60 also contains point 40 which is the intersection point of the tubes' center lines. Thus, the first tube 12 is made to angularly misalign relative to the second tube 16 along the spherical path having a center point at point 40. While the line of contact in FIG. 1 between the outer surface 36 and the ring part 60 is circular when the two tubes are aligned, this line of contact is elliptical in FIG. 2 and the center of this ellipse is also at point 40.

In addition to providing this guiding of angular movement of one tube relative to the other, the guiding mechanism 28 provides a limit or restraint to this angular movement when the free, distal edge of the arcuate follower 54 has reached its maximum penetration of the arcuate cavity 52 with a portion thereof contacting the the tube 12 outer surface between ring members 46 and 48.

Moreover, tension forces tending to pull tubes 12 and 16 axially away from each other are restrained by the coupling of the arcuate follower 54 and the guide assembly 42 by reception of the arcuate follower in the arcuate cavity 52 defined by arcuate ring members 46 and 48.

Additionally, the guiding mechanism 28 keeps the curved outer surface 36 of the sealing element 26 restrained in its movement only along the ring part 60 and the frustoconical part 62 of the second tube 16. By so doing a viable seal is maintained and the acceleration and bending loads are prevented from crushing the thin, resilient sealing element 26.

EMBODIMENT OF FIGS. 3 AND 4

The embodiment of the present invention shown in FIGS. 3 and 4 is similar to that shown in FIGS. 1 and 2 and has numerous similar parts provided with the same character numerals. However, in addition to providing a guiding mechanism during angular misalignment of two tubes, this embodiment provides for axial movement of one tube relative to the other.

Thus, as shown in FIG. 3, a first conduit 10 is welded along weld line 14 to a first tube 68 and a second conduit 18 is welded along weld line 20 to a second tube 70. The sealing element 26 is the same as that shown in FIGS. 1 and 2 and comprises a cylindrical portion 30, a frustoconical portion 32 and a ring portion 34 with a curved outer surface 36. The cylindrical portion 30 is rigidly attached to the first tube 68 on the exterior surface thereof with the tube continuing past the ring portion 34 where it terminates in an arcuate flange 72. This elongation of tube 68 tends to reduce turbulence in the interface between tubes 68 and 70 if the fluid flowing therethrough has a high velocity. However, if low velocity is present and chance of turbulence is small, tube 68 can be cut short around the interface of frustoconical portion 32 and cylindrical portion 30.

The guide assembly 74 is formed by a first arcuate ring member 76 having a ring base extending therefrom and rigidly coupled to the cylindrical portion 30 of the sealing element 26. The second arcuate ring member 48 is spaced from the first arcuate ring member 76 defining the arcuate cavity 52 therebetween, the second ring member 48 having a ring base 40 rigidly coupled to the top of ring base 78.

The arcuate follower 54 is movable in the arcuate cavity 52 and has a curved extension 80 rigidly coupled to the inside of a ring 82 which extends into the larger end of a frustoconical section 84. This frustoconical section has its smaller end extending into a cylindrical section 86 which slidably receives the exterior surface of the second tube 70. Thus, in this embodiment, the follower assembly 88 comprises arcuate follower 54, curved extension 80, ring 82, frustoconical section 84 and cylindrical section 86.

As seen in FIG. 3, a curved flange 90 is located at the open end of the second tube 70, which flange is located between the inner surface of the frustoconical section 84 and the inner surface of the first arcuate ring member 76.

Thus, axial displacement of the first tube 68 relative to the second tube 70 is accomplished by allowing the second tube 70 to slide along the inner surface of the cylindrical section 86 on the follower assembly 88. However, this axial movement is limited in a first direction by a stopping engagement of the curved flange 90 with the frustoconical section 84 and in the opposite direction by a stopping engagement of the curved flange with the first arcuate ring member 76. As shown in FIG. 3, the second tube 70 is midway between these two stop positions and can move in both directions.

Referring now to FIG. 4, the first and second tubes are shown angularly misaligned through an angle b of about 5° so that the center line 92 of the first tube intersects the center line 94 of the second tube at an intersection point 96. As described above regarding FIGS. 1 and 2, this point 96 is also the center point of the ellipse formed by the line contact of outer surface 36 with the interior surface of the second tube. In addition, referring to FIG. 3, point 96 is the center of the circular line contact of outer surface 36 with the interior surface of the second tube while these tubes are aligned so their center lines 92 and 94 coincide.

The angular misalignment of the embodiment shown in FIGS. 3 and 4 is the same as that discussed above regarding FIGS. 1 and 2 insofar as guide assembly 74 and follower assembly 88 maintain the intersection point 96 of the center lines of the tubes during angular misalignment thereof in the plane, shown by numeral 98 in FIGS. 3 and 4, containing the line of contact of the sealing element 26 and the interior surface of the second tube 70. As also shown in FIG. 4, tubes 68 and 70 have experienced relative axial movement vis-a-vis their relative position in FIG. 3. Contact of curved flange 90 with frustoconical section 84 limits movement apart of tubes 68 and 70, and contact of flange 90 with ring member 76 limits movement together of these tubes 68 and 70.

EMBODIMENT OF FIG. 5

The embodiment of FIG. 5 is similar to the embodiment shown in FIG. 1 except that the second tube 100 is divided into a first section 102 and a second section 104 which are releasably connected together by means of a clamping apparatus 106. The details of the structural interrelationship of the first and second sections, as well as the clamping apparatus, are fully disclosed in U.S. Pat. No. 3,797,836, issued on Mar. 19, 1974, to Horace P. Halling, the disclosure of which is hereby incorporated by reference.

As shown in FIG. 5, the first section 102 of tube 100 has an arcuate follower 108 integrally formed thereon which extends into and is movable in the arcuate cavity 52 discussed above regarding FIG. 1. A sealing element 26 similar to that disclosed above regarding FIG. 1 is utilized which contacts the interior cylindrical surface of the first section 102. Thus, the embodiment of FIG. 5 operates in a fashion similar to that disclosed regarding FIG. 1, except it has the capability of releasably connecting two sections of the second tube in order to easily install or remove sections of the piping system for maintenance purposes.

Moreover, this embodiment is particularly useful in tension systems wherein three joints are used to provide full offset, angular and axial misalignment to a ducting system including a source of fluid under pressure, a first tube coupled via a first flexible joint to the source, a second tube coupled via a second joint to the first tube, and a utilizer of the fluid's pressure coupled via a third flexible joint to the second tube. That is, if the first and third joints are in accordance with the joint shown in FIG. 5, they can be placed extremely close to the source and utilizer of the pressure (due to their compactness) resulting in a greater amount of lateral offset and axial misalignment with a minimum amount of angular misalignment in the flexible joints, thus enabling them to be very compact.

While various embodiments have been chosen to illustrate the invention, it will be understood by those skilled in the art that various changes and modifications can be made therein without departing from the scope of the invention as defined in the appended claims.

What is claimed is:

1. A fluid-tight coupling and sealing apparatus for a first cylindrical tube and a second cylindrical tube having high pressure fluid flowing therethrough, the combination comprising:
   a metallic, resilient annular sealing element extending from the first tube,
   said sealing element having a ring portion having an outer surface with a maximum free diameter greater than the diameter of the interior cylindrical surface of the second tube and in contact via an interference fit with the interior cylindrical surface of the second tube sufficient to cause elastic deformation of said sealing element, thereby forming a fluid-tight seal therebetween; and
   guiding means, coupled at least to the first tube, for maintaining the intersection point of the center lines of the tubes during angular misalignment thereof in the plane containing the line of contact of said annular sealing element and the interior cylindrical surface of the second tube;
   said guiding means comprising a guide assembly formed of first and second arcuate ring members spaced apart to define an arcuate annular cavity therebetween, said first and second arcuate ring members being coupled to the first tube,
   said guiding means further comprising a follower assembly coupled to the second tube and having an arcuate follower movable in said cavity, said follower having a thickness substantially equal to the thickness of said cavity.

2. An apparatus according to claim 1, wherein
   said sealing element further comprises a frustoconical portion extending from the first tube, and
   said ring portion extends from the larger end of said frustoconical portion.

3. An apparatus according to claim 2, wherein
   said sealing element further comprises a cylindrical portion coupled to the first tube, said cylindrical portion extending from the smaller end of said frustoconical portion.

4. An apparatus according to claim 1, wherein
   said ring portion outer surface is curved.

5. An apparatus according to claim 7, wherein
   said ring portion curved outer surface has a radius of curvature less than the radius of the interior surface of the second tube which said curved outer surface contacts.

6. An apparatus according to claim 1, wherein
   the surfaces of said first and second arcuate ring members defining said arcuate cavity are spherical segments with the center of the sphere being located at the intersection point of the two tubes' center lines during angular misalignment thereof.

7. An apparatus according to claim 1, wherein
   the opposed surfaces of said arcuate follower are spherical segments with the center of the sphere being located at the intersection point of the two tubes' center lines during angular misalignment thereof.

8. An apparatus according to claim 1, wherein
   said follower assembly is rigidly secured to the second tube.

9. An apparatus according to claim 1, wherein
   said follower assembly further comprises a cylindrical section slidably receiving the exterior surface of the second tube.

10. An apparatus according to claim 9, wherein
    said follower assembly further comprises a frustoconical section extending from said cylindrical section at the smaller end thereof,
    said arcuate follower extends from the larger end of said frustoconical section, and
    stop means are provided on the end of the second tube for engaging said frustoconical section to limit axial displacement of the first and second tubes in a first direction and for engaging said first arcuate ring member to limit axial displacement in an opposite direction.

11. An apparatus according to claim 1, wherein the second tube has a first section and a second section, and means for releasably connecting said first and second sections, said ring portion outer surface contacting the interior surface of said first section of the second tube.

12. An apparatus according to claim 1, wherein the plane containing the line of contact of said annular sealing element and the interior cylindrical surface of the second tube is axially spaced relative to the axes of the first and second tubes from the plane containing the end of said arcuate follower movable in said cavity of said guide assembly.

13. An apparatus according to claim 7, wherein the maximum free diameter of said ring portion is smaller than the diameter of the interior spherical segment forming the interior surface of said arcuate follower.

* * * * *

UNITED STATES PATENT OFFICE
CERTIFICATE OF CORRECTION

PATENT NO. : 4,071,269
DATED : Jan. 31, 1978
INVENTOR(S) : Horace P. Halling and Bernard J. Sadoff, Jr.

It is certified that error appears in the above-identified patent and that said Letters Patent are hereby corrected as shown below:

In claim 5, line 1, change "7" to --4--

Signed and Sealed this

Ninth Day of May 1978

[SEAL]

Attest:

RUTH C. MASON
Attesting Officer

LUTRELLE F. PARKER
Acting Commissioner of Patents and Trademarks